United States Patent [19]

Takahashi

[11] Patent Number: 5,076,606
[45] Date of Patent: Dec. 31, 1991

[54] ACTIVE SUSPENSION SYSTEM WITH HYDRAULIC CIRCUIT HAVING LINE PRESSURE DEPENDENT FLOW RESTRICTION FOR WORKING FLUID INTRODUCED INTO AND DRAINED FROM WORKING CHAMBER

[75] Inventor: Kenro Takahashi, Kanagawa, Japan

[73] Assignee: Nissan Motor Company, Limited, Kanagawa, Japan

[21] Appl. No.: 501,086

[22] Filed: Mar. 27, 1990

[30] Foreign Application Priority Data

Mar. 28, 1989 [JP] Japan ............................ 1-71988

[51] Int. Cl.⁵ ............................................ B60G 21/06
[52] U.S. Cl. ................................. 280/714; 280/709
[58] Field of Search ............... 280/707, 702, 714, 840, 280/6.12, 704

[56] References Cited

U.S. PATENT DOCUMENTS

| 4,702,490 | 10/1987 | Yamaguchi et al. | |
| 4,848,790 | 7/1989 | Fukunaga | 280/707 |
| 4,865,348 | 9/1989 | Hano | 280/707 |
| 4,903,983 | 2/1990 | Fukushima | 279/707 |

FOREIGN PATENT DOCUMENTS

| 0249209 | 6/1987 | European Pat. Off. |
| 0249227 | 6/1987 | European Pat. Off. |
| 0283004 | 3/1988 | European Pat. Off. |
| 0284053 | 3/1988 | European Pat. Off. |
| 0285153 | 3/1988 | European Pat. Off. |
| 0286072 | 4/1988 | European Pat. Off. |
| 0314164 | 10/1988 | European Pat. Off. |
| 0318721 | 11/1988 | European Pat. Off. |
| 0318932 | 11/1988 | European Pat. Off. |
| 0345816 | 6/1989 | European Pat. Off. |
| 0345817 | 6/1989 | European Pat. Off. |
| 3902312 | 1/1989 | Fed. Rep. of Germany |
| 3904922 | 2/1989 | Fed. Rep. of Germany |
| 3910030 | 3/1989 | Fed. Rep. of Germany |
| 3910445 | 3/1989 | Fed. Rep. of Germany |
| 61-249509 | 6/1986 | Japan |

Primary Examiner—Kenneth R. Rice
Assistant Examiner—Karin Tyson
Attorney, Agent, or Firm—Lowe, Price, Leblanc & Becker

[57] ABSTRACT

An active suspension system includes a hydraulic circuit associated with a pressure control valve for adjusting fluid pressure in a working chamber of an active cylinder. A variable orifice is provided between a control portion of the pressure control valve and the working chamber. The variable orifice is operated to provide a first full path area while a line pressure in a supply line for feeding pressurized fluid to said pressure control valve is higher than a predetermined pressure level and a second restricted path area when the line pressure is lower that the predetermined level.

10 Claims, 9 Drawing Sheets

ACTIVE SUSPENSION SYSTEM WITH HYDRAULIC CIRCUIT HAVING LINE PRESSURE DEPENDENT FLOW RESTRICTION FOR WORKING FLUID INTRODUCED INTO AND DRAINED FROM WORKING CHAMBER

BACKGROUND OF THE INVENTION

1. Field of the Invention

The present invention relates generally to an active suspension system which varies suspension characteristics according to vehicle driving condition for achieving high level riding comfort and vehicle driving stability. More specifically, the invention relates to a hydraulic circuit for an active suspension system, which can provide wider adjusting range of suspension characteristics in order to permit softening of suspension characteristics without degradation of attitude change suppressing ability.

2. Description of the Background Art

U.S. Pat. No. 4,702,490, issued on Oct. 27, 1987 which has been assigned to the common owner to the present invention, discloses one of typical construction of an actively controlled suspension system, in which a hydraulic cylinder defining a working chamber is disposed between a vehicular body and a suspension member rotatably supporting a vehicular wheel. The working chamber of the hydraulic cylinder is communicated with a hydraulic circuit including a pressurized working fluid source. A pressure control valve, such as an proportioning valve assembly, is disposed in the hydraulic circuit, which is connected to an electric or electronic control circuit to be controlled the valve position. The pressure control valve is controlled the valve position by a suspension control signal produced in the control circuit for adjusting pressure in the working chamber and whereby controlling suspension characteristics.

On the other hand, European patents 0 283 004, 0 285 153 and 0 284 053 discloses technologies for controlling the suspension systems constructed as set forth above, depending upon the vehicle driving condition for suppressing rolling and/or pitching of the vehicular body.

In one of the typical construction of the hydraulic circuit includes a pressure source unit which comprises a fluid pump drivingly associated with an automotive internal combustion engine so as to be driven by the engine output torque. The fluid pump is generally rated to produce rated pressure which is selected in view of the required line pressure in a supply line for supplying the pressurized fluid to the working chamber, at the minimum revolution speed of the engine so that the working fluid pressure to be supplied to the working chamber of the hydraulic cylinder can be satisfactorily high at any engine driving range. As will be appreciated, the output pressure of the fluid pump increases according increasing of the engine revolution speed. Therefore, at high engine revolution speed range, excessive pressure in excess of a predetermined maximum line pressure is relieved via a relief valve. Therefore, the engine output can be wasted to degrade engine driving performance as a power plant for the automotive vehicle and thus degrade fuel economy.

On the other hand, in the practical operation of the active suspension system, the fluid pressure in the working chamber in the hydraulic cylinder can be maintained at constant value for maintaining a desired vehicular height, at substantially low vehicle speed range or while the vehicle is not running. Despite this fact, the prior proposed hydraulic circuits for the actively controlled suspension systems supply the rated pressure of the fluid pump which should be higher than a minimum line pressure required for adjustment of the fluid pressure in the working chamber. In order to maintain the rated pressure to be output from the fluid pump, substantial engine output will be consumed even at the low vehicle speed range, in which the line pressure is not required for no possibility of adjustment of the suspension characteristics.

Improvement in the hydraulic circuit for the prior proposed active suspension system has been proposed in the co-pending U.S. patent application Ser. No. 331,602, filed on Mar. 31, 1989, U.S. Pat. No. 4,911,468 which application has been commonly assigned to the common assignee to the present invention. The corresponding invention to the above-identified co-pending U.S. Patent Application has been published as Japanese Patent First (unexamined) Publication (Tokkai) Heisei 1-249509, published on Oct. 4, 1989. The prior invention has been directed to a hydraulic circuit for an actively controlled suspension system which employs first and second pressure relief valves disposed in a hydraulic pressure source circuit for relieving excessive pressure. The second pressure relief valve is provided a lower relief pressure than that of the first pressure relief valve. Means for selectively connecting and disconnecting the second pressure relief valve is disposed in the hydraulic pressure source circuit at an orientation upstream of the second pressure relief valve. The means is positioned at shut-off position to disconnect the second pressure relief valve when a vehicle traveling speed is higher than a predetermined speed. The means is responsive to the vehicle speed lower than the predetermined speed for establishing connection between a pressurized fluid source to the second relief valve for relieving the pressure at lower level than that established when the vehicle speed is higher than the predetermined speed.

In the prior proposed suspension systems as set forth above, active suspension control is taken place for adjusting suspension characteristics by introducing and draining line pressure in a hydraulic circuit. In prior proposed constructions of the active suspension systems, line pressure in a supply line in the hydraulic circuit tends to drop below a set pressure during vehicular bouncing action due to rapid increase of supply amount of the pressurized fluid into the working chamber. Lowering of line pressure may cause lowering damping characteristics in a hydraulic cylinder. In order to avoid this, it is the prior proposed technologies to provide a fixed path area orifice for restricting fluid flow. Typically, such fixed flow path area orifice is provided in a drain circuit for restricting fluid flow in the drain line and whereby restricting magnitude of lowering of the fluid pressure in the working chamber so that sufficient damping characteristics can be maintained even during vehicular bouncing action.

Such prior proposed strategy is effective in terms of providing sufficient damping characteristics against bouncing action of the vehicle. However, on the other hand, the presence of the fixed path area orifice clearly degrade drainage performance of the hydraulic circuit and thus serves to prevent the working fluid in the working chamber to be effectively drained. This causes limitation of softening of suspension systems.

SUMMARY OF THE INVENTION

Therefore, it is an object of the present invention to provide an active suspension system which permits wider range of adjustment of working fluid pressure in a working chamber and thus allows the suspension system to have softer suspension characteristics than that in the prior art without causing degradation of vibration damping capability.

Another object of the present invention is to provide an active suspension system which has an adjustable orifice for providing adjustment of flow restriction in a drain line and whereby provide softer suspension characteristics at the vehicle driving condition where riding comfort is important and sufficiently hard suspension characteristics at the vehicle driving condition where driving stability is important.

In order to accomplish aforementioned and other objects, an active suspension system, according to the present invention, includes a hydraulic circuit associated with a pressure control valve for adjusting fluid pressure in a working chamber of an active cylinder. A variable orifice is provided between a control portion of the pressure control valve and the working chamber. The variable orifice is operated to provide a first full path area while a line pressure in a supply line for feeding pressurized fluid to said pressure control valve is higher than a predetermined pressure level and a second restricted path area when the line pressure is lower that the predetermined level.

According to one aspect of the invention, an active suspension system comprises:

a hydraulic cylinder disposed between a vehicle body and a suspension member rotatably supporting a road wheel, the hydraulic cylinder defining a variable pressure working chamber;

a pressure source for supplying a pressurized fluid;

a pressure control valve assembly disposed between the pressure source and the working chamber for introducing and draining the fluid pressure into and from the working chamber, the pressure control valve assembly defining a first chamber connected to the working chamber for fluid communication therebetween via a first line, a second chamber connected to a fluid pressure source via a second line for introducing line pressure from the fluid pressure source into the working chamber, and a third chamber connected to the fluid pressure source via a third line for draining pressurized fluid to the fluid pressure source from the working chamber, the pressure control valve assembly including a valve member for selectively establishing and blocking fluid communication between the first and second chambers and the first and third chambers; and a line pressure responsive flow restriction means for restricting fluid flow from the working chamber, the flow restriction means being responsive to the line pressure in the second line higher than or equal to a predetermined pressure level for providing a first and smaller flow restriction magnitude and responsive to the line pressure in the second line lower than the predetermined pressure level for providing a second and greater flow restriction magnitude.

The line pressure responsive flow restriction means may comprise a variable orifice assembly disposed in the first line. In the alternative, the variable orifice assembly may be disposed in the third line.

In the preferred construction, the variable orifice assembly is switchable between a first position, at which the fluid path is fully open to provide the first flow restriction magnitude and a second position, at which the fluid path area is limited to provide second flow restriction magnitude.

The pressure control valve may further define a pilot chamber to which a pilot pressure derived from the line pressure is introduced from the second line and drained to the third line, the pilot chamber being oriented in opposition to one end of the valve member, and a feedback chamber opposing to the valve member, to which a feedback pressure in the first line is introduced so that the valve member is placed at a position where a balance between the pilot pressure and the feedback pressure is established. The line pressure responsive flow restriction means is provided at an orientation upstream or downstream of a junction where a pilot pressure return line for connecting the pilot chamber to the third line is connected to the third line.

In the further alternative, the pressure control valve may be provided for each of a plurality of suspension systems for each road wheel for independent adjustment to the other, the third line includes a plurality of branched lines respectively connected to the third chamber of each of the pressure control valves and adjoined to each other at a confluence point, and the line pressure responsive flow restriction means is provided at an orientation downstream of the confluence point.

BRIEF DESCRIPTION OF THE DRAWINGS

The present invention will be understood from the detailed description given herebelow and from the accompanying drawings of the preferred embodiments of the invention, which, however, should not be taken for limiting the invention to the specific embodiments, but are for explanation and understanding only.

In the drawings.

DESCRIPTION OF THE PREFERRED EMBODIMENT

Figure 1:
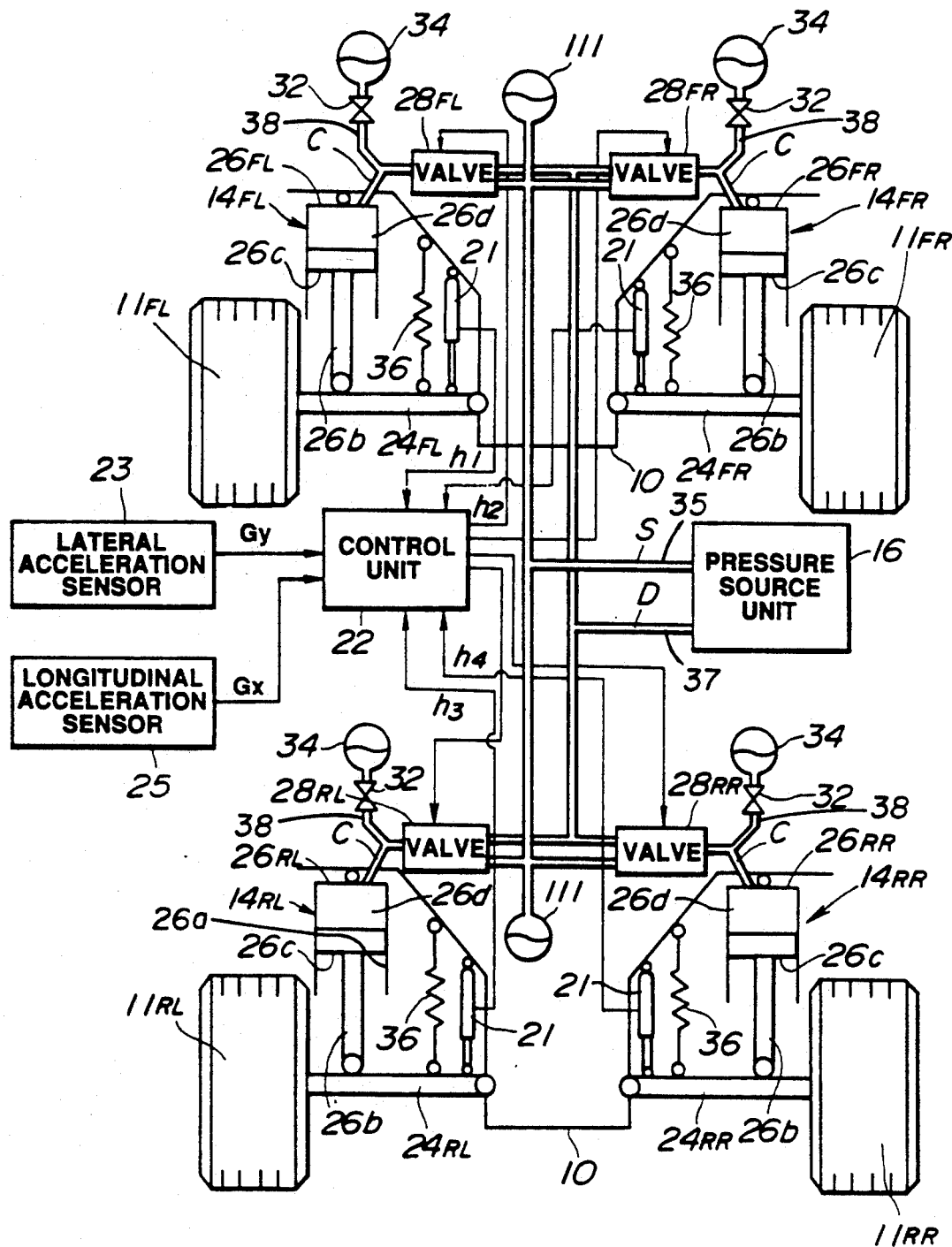
FIG. 1 is a diagrammatical illustration of the overall construction of the preferred embodiment of an active suspension system, according to the present invention, in which the preferred embodiment of a proportioning valve assembly is employed as a pressure control valve.

Referring now to the drawings, particularly to FIG. 1, the preferred embodiment of an active suspension system, according to the present invention, is designed to generally perform suspension control for regulating vehicular height level and vehicular attitude by suppressing relative displacement between a vehicular body 10 and suspension members 24FL, 24FR, 24RL and 24RR provided in front-left, front-right, rear-left and rear-right suspension mechanism 14FL, 14FR, 14RL and 14RR and rotatably supporting front-left, front-right, rear-left and rear-right wheels 11FL, 11FR, 11RL and 11RR. The suspension member will be hereafter represented by the reference numeral "24" as generally referred to. Similarly, the suspension mechanism as generally referred to will be hereafter represented by the reference numeral "14". Respective front-left, front-right, rear-left and rear-right suspension mechanisms 14FL, 14FR, 14RL and 14RR have hydraulic cylinders 26FL, 26FR, 26RL and 26RR which will be represented by the reference numeral "26" as generally referred to.

Each of the hydraulic cylinder 26 is disposed between the vehicular body 10 and the suspension member 24 to produce a damping force for suppressing relative displacement between the vehicular body and the suspension member. The hydraulic cylinder 26 generally comprises an essentially enclosed cylindrical cylinder body 26a defining therein an enclosed chamber. A thrusting piston 26c is thrustingly and slidably disposed within the enclosed chamber of the hydraulic cylinder 26 for defining in the latter a working chamber 26d. The piston 26c is connected to the associated one of suspension member 24 via a piston rod 26b. A suspension coil spring 36 employed in the instant suspension system is not required to have a resilient force of a magnitude required in the ordinary suspension system but is only required to have a resilient force necessary for maintaining the vehicular body about the suspension member.

The working chamber 26d of the hydraulic cylinder 26 is connected to one of pressure control valves 28FL, 28FR, 28RL and 28RR via a pressure control line 38. The pressure control valve 28FL, 28FR, 28RL and 28RR will be hereafter represented by the reference numeral "28" as generally referred to. The pressure control valve 28 is, in turn, connected to a pressure source unit 16 via a supply line 35 and a drain line 37. A branch circuit is provided for connecting the pressure control line 38 to a pressure accumulator 34 via a flow restricting means, such as an orifice 32. Another pressure accumulator 111 is provided in the supply line 35 for accumulating the excessive pressure generated in the pressure source unit 16.

The pressure control valves 28 comprise, though it is not clearly shown in FIG. 1, electrically or electromagnetically operable actuators (reference is made to FIG. 2), such as a proportioning solenoids. The actuators are connected to a microprocessor based control unit 22. The control unit 22 is connected a plurality of vehicular height sensors 21 which are disposed in respectively associated suspension mechanism and designed for monitoring relative position of the vehicular body 10 and the relevant suspension member 24 to produce a vehicular height level indicative signals $h_1$, $h_2$, $h_3$ and $h_4$. The control unit 22 is also connected to a lateral acceleration sensor 23, a longitudinal acceleration sensor 25 and so forth to receive the vehicle driving condition indicative parameters. Based on these control parameters, including the height level indicative signals, a lateral acceleration indicative signal $G_y$ generated by the lateral acceleration sensor, a longitudinal acceleration indicative signal $G_x$ generated by the longitudinal acceleration sensor, and so forth, the control unit performs anti-rolling, anti-pitching and bouncing suppressive suspension controls.

While only the specific sensors are shown, such as the vehicle height sensors which comprise strike sensor, the lateral acceleration sensor 23 and the longitudinal acceleration sensor 25, it is possible to replace or add any other sensors which monitor vehicle driving parameters associated with the suspension control. For instance, the stroke sensors employed in the shown embodiment can be replaced with one or more vertical acceleration sensors. Similarly, the lateral acceleration sensor may be replaced with a steering angle sensor for monitoring steering behaviour for assuming lateral force to be exerted on the vehicular body. In the later case, the parameter indicative of the steering angular displacement may be used in combination of a vehicular speed data since vehicular speed may influence for rolling magnitude of the vehicle during steering operation.

Figure 2:
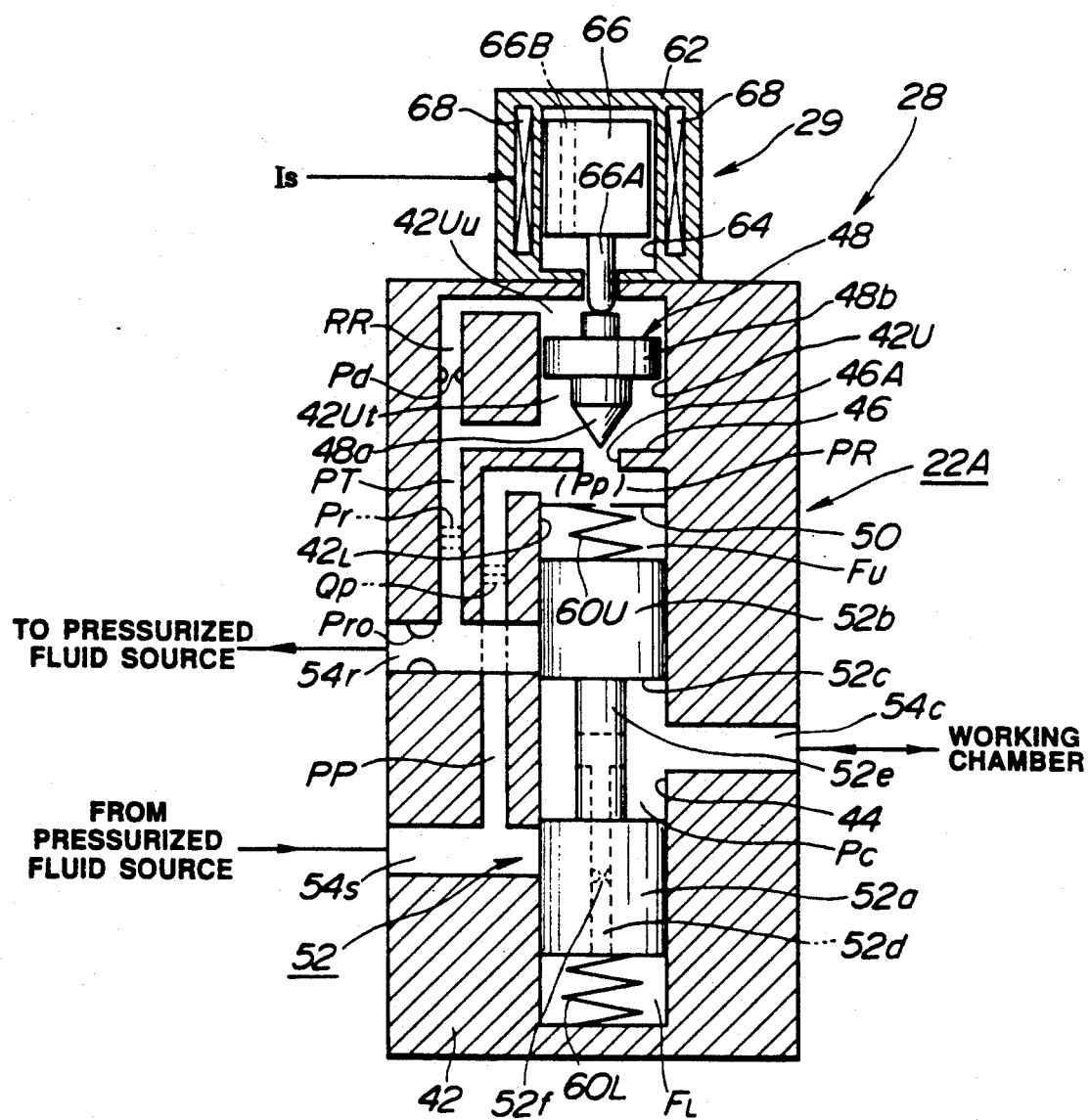
FIG. 2 is a sectional view of the preferred embodiment of the pressure control valve according to the present invention.

As shown in FIG. 2 in detail, the pressure control valve 28 comprises a proportioning valve assembly and is designed to be controlled by an electric current as a control signal supplied from the control unit 22 for varying valve position according to variation of the current value of the control signal. Generally, the pressure control valve 28 controls magnitude of introduction and draining of pressurized fluid into and from the working chamber 26d for adjusting the pressure in the working chamber. As will be appreciated, since the adjusted fluid pressure in the working fluid determines damping force to be created in response to relative displacement between the vehicle body 10 and the suspension member 24. Mode of the suspension mechanism is varied according to variation of the fluid pressure in the working chamber between a predetermined hardest mode to most soft mode.

In the construction of the pressure control valve shown in FIG. 2, the pressure control valve 28 includes a valve housing 42. The valve housing 42 defines a valve bore 44 which is separated in to a valve chamber 42L and a control chamber 42U by means of a partitioning wall 46. The partitioning wall 46 is formed with a communication path opening 46A for communication between the control chamber 42U and the valve chamber 42L. As seen from FIG. 2, the control chamber 42U and the valve chamber 42L are arranged in alignment to each other across the communication path opening 46A. In parallel to a section of the partitioning wall 46 extending perpendicular to the axis of the valve chamber 42L and the control chamber 42U, a fixed orifice defining partitioning member 50 is provided. The partitioning member 50 defines a throttling orifice which is oriented substantially in alignment with the communication path opening 46A. The partitioning wall 46 and the partitioning member 50 are cooperative for defining a pilot chamber PR therebetween.

A valve spool 52 is thrustingly and slidingly disposed within the valve chamber 42L. The valve spool 52 defines an upper feedback chamber FU between the tip end thereof and the partitioning member 50. The valve spool 52 also defines a lower feedback chamber FL between the other tip end thereof and the bottom of the valve chamber 42L. Offset springs 60U and 60L are disposed within the upper and lower feedback chambers FU and FL, which offset springs exerts spring force to the valve spool 52 for resiliently restricting movement of the latter. Resilient force of the offset springs 60U and 60L are so set as to balance to place the valve spool 52 at a neutral position, when the fluid pressure in the upper and flow feedback chambers FU and FL balances to each other. The valve chamber 42L is communicated with a supply line 35 via an supply port 54s, a drain line 37 via a drain port 54r and a pressure control line 38 via a control port 54c, which supply port, drain port and control port are defined in the valve housing 42. The valve spool 52 at the aforementioned neutral position, blocks fluid communication of the pressure control chamber PC with any of the supply port 54s and the drain port 54r. As a result, as long as the valve spool 52 is maintained at the neutral position, overall fluid force in the hydraulic circuit downstream of the pressure control valve, which circuit includes the working chamber 26d of the hydraulic cylinder 26 is held constant.

The valve spool 52 is formed with lands 52a and 52b connected to each other via smaller diameter bar-like section 52e. The land 52a is oriented adjacent the lower feedback chamber $F_L$ so as to subject the tip end to the fluid pressure in the lower feedback chamber. Similarly, the land 52b is oriented adjacent the upper feedback chamber Fu so as to subject the tip end to the fluid pressure in the upper feedback chamber. The bar-like section 52e between the lands 52a and 52b is cooperative with the peripheral wall of the valve chamber 42L in order to define therebetween a pressure control chamber PC. A fluid flow path 52d is formed through the valve spool 52. The fluid flow path 52d has one end communicated with the pressure control chamber PC and the other end communicated with the lower feedback chamber $F_L$. A fixed flow restricting orifice 52f is formed in the fluid flow path 52d for restricting fluid flow therethrough.

A poppet valve member 48 is disposed within the control chamber 42U for thrusting movement therein. The poppet valve member 48 has a valve head 48a of an essentially conical configuration. The valve head 48a opposes to the communication path opening 46A of the partitioning wall 46. The poppet valve member 48 is operably associated with a proportioning solenoid assembly 29 as the actuator. The proportioning solenoid assembly 29 comprises a housing 62 rigidly secured on the valve housing 42 and defining an internal space to receive therein a plunger 66. The plunger 66 has a plunger rod 66A. The tip end of the plunger rod 66A is kept in contact with the tip end of the poppet valve member 48 remote from the valve head 48a. Therefore, the poppet valve member 48 is axially driven by means of the plunger 66 to control the path area in the communication path opening 46A according to the position of the tip end of the plunger rod 66A. Adjusting of the path area in the communication path opening 46A results in variation of fluid pressure to be introduced into the pilot chamber PR.

In order to control the position of the plunger 66 with the plunger rod 66A, a proportioning solenoid coil 68 is housed within the housing 62 and surrounds the plunger 66. The interior space of the housing 62 is connected to the control chamber 42U for fluid communication therebetween. The plunger 66 is formed with a fluid path 66B for fluid communication between upper and lower sections of the interior space. Therefore, the fluid pressure in the upper and lower sections of the interior space of the housing 62 is held equal to the pressure in the control chamber 42U. This cancels fluid pressure to be exerted on the poppet valve and the plunger so that the position of the tip end of the plunger rod 66A can be determined solely depending upon the magnitude of energization of the proportioning solenoid coil 68.

As seen from FIG. 2, the poppet valve member 48 has a cylindrical larger diameter section 48b for separating the control chamber 42U into upper section and lower section 42Uu and 42Ul. The upper and lower sections 42Uu and 42Ul are communicated with the drain port 54r via a pilot return path PT. A multi-stage orifice Pr is provided in the pilot return path PT for restricting fluid flow therethrough. The multi-stage orifice Pr comprises a plurality of strips formed with through openings and is so designed that one of the orifice oriented at most upstream side is mainly effective for restricting fluid flow when fluid flowing therethrough is steady flow and that all of the orifices of respective strips are equally effective for restricting fluid flow when fluid flow therethrough is disturbed and not steady. Therefore, as will be appreciated herefrom, the multi-stage orifice Pr employed in the shown embodiment serves to provide greater fluid flow restriction against non-steady or disturbed fluid flow than that for the steady flow. As seen from FIG. 2, the multi-stage orifice Pr is provided upstream of the upper and lower sections 42Uu and 42Ul. On the other hand, a fixed throttling orifice Pd is provided at an orientation downstream of the lower section 42Ul and upstream of the upper section 42Uu. Similarly, the pilot chamber PR is communicated with the supply port 54s via a pilot path PP. A multi-stage orifice Qp which has similar construction and flow restricting function to that of the multi-stage orifice Pr is provided in the pilot path PP.

A fixed throttle orifice Pro is also provided in the drain port 54r for restricting fluid flow therethrough. The diameter of the fluid path at the orifice Pro is so selected as to create great flow restriction against pulsatile fluid flow cyclically varying the fluid pressure at a frequency approximately 1 Hz.

As can be seen from FIG. 2, the pressure control valve 28 is so arranged as to direct the axis of the valve bore 44 parallel to the longitudinal axis of the vehicle body. The longitudinal acceleration to be exerted on the vehicular body is much smaller than the lateral acceleration and vertical acceleration exerted on the vehicle body. Therefore, by arranging the pressure control valve 28 so that the poppet valve 48 and the valve spool 52 thrustingly move in longitudinal direction, influence of the externally applied acceleration can be minimized.

Figure 3:
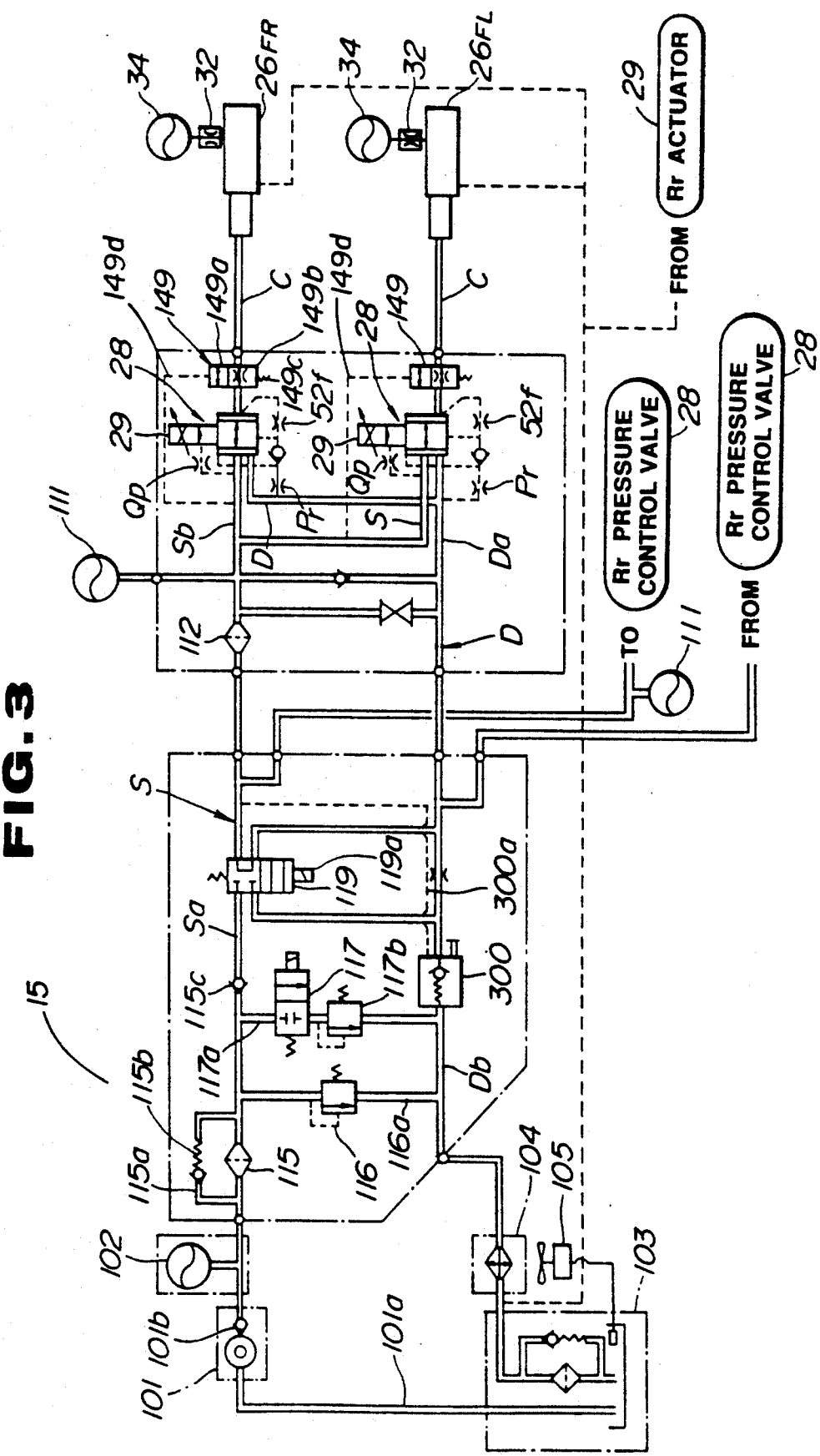
FIG. 3 is a circuit diagram of one example of hydraulic circuit which is applicable for the active suspension system according to the present invention.

FIG. 3 shows detailed circuit construction of one example of hydraulic circuit which is applicable for the shown embodiment of the active suspension system, according to the present invention. The hydraulic circuit includes a fluid pressure source circuit 15 which includes the pressure source unit. As can be appreciated, although FIG. 3 shows only part of the hydraulic circuit for the front-left and front-right suspension systems, substantially the same construction of circuits branched from the circuit for the front-left and front-right suspension systems as illustrated are provided for the rear suspension systems. The pressure source unit includes the pressure unit 101 which comprises a fluid pump assembly, and is connected to a fluid reservoir 103 via a suction pipe 101a. The fluid pump assembly 101 is associated with an automotive engine (not shown) so as to be driven by the output torque of the latter output from an engine output shaft. The outlet of the pressure unit 101, through which the pressurized working fluid is discharged, is connected to the supply port 54s of the pressure control valve 28 via the supply line 35. An one-way check valve 101b, a pressure accumulator 102 for absorbing pulsatile, a filter 115 are disposed in a portion Sa of the supply line S. A by-pass passage 115a with an one-way check valve 115b is provided for by-passing the filter 115.

Pressure accumulators 111 are also connected to the supply line S to receive therefrom the pressurized fluid for accumulating the pressure. A one-way check valve 115c and a filter 115 are disposed in the supply line S at a position upstream of the junction between the pressure accumulators 111 and the supply line S.

A pressure relief line 116a is also connected to the supply line S at the position intermediate between the filter 115 and the one-way check valve 115c, at one end. The other end of the pressure relief line 116a is connected to the drain line D. A pressure relief valve 116 is disposed in the pressure relief line 116a. The pressure relief valve 116 is responsive to the fluid pressure in the supply line S higher than a set pressure to drain the excessive pressure to the drain line for maintaining the line pressure in the supply line S below the given line pressure level.

On the other hand, an operational one-way check valve 300 is disposed between the sections Da and Db of the drain line D. The operational one-way check valve 300 is also connected to the supply line S at downstream of the one-way check valve 115c to receive therefrom the pressure in the supply line as a pilot pressure, via a pilot line 300a. The operational one-way check valve 300 is designed to be maintained at open position as long as pilot pressure introduced from the supply line S at the orientation downstream of the one-way check valve 115c is held higher than a predetermined pressure. At the open position, the operational one-way check valve 300 maintains fluid communication between the inlet side and outlet side thereof so that the working fluid in the drain line D may flow therethrough to the reservoir tank 103. On the other hand, the operational one-way check valve 300 is responsive to the working fluid pressure in the supply line S downstream of the one-way check valve 115c serving as the pilot pressure dropping below the predetermined pressure level to be switched into shut-off position. At the shut-off position, the operational one-way check valve 300 blocks fluid communication between the drain port 54r of the pressure control valve 28 and the reservoir tank 103. In the shown embodiment, the predetermined pressure is set at a pressure corresponding to the neutral pressure of the pressure control valve unit 28.

An unload valve 117 is provided in parallel relationship to the pressure relief valve 116. An unloading line 117a connect the unload valve 117 to the supply line S at a junction between the junction of the pressure relief line 116a and the one-way check valve 115c, and to the drain line at a junction oriented downstream of the operational one-way check valve 300. A pressure regulating valve 117b is also disposed in the unload line 117a for permitting the pressurized fluid flow from the supply line S to the drain line D when the line pressure in the supply line is in excess of the neutral pressure $P_N$.

A fail-safe valve 119 is provided between the one-way check valve 115c and the junction of the pilot line 300a and the supply line S. The fail-safe valve 119 has ports respectively connected to the portions Sa and Sb of the supply line S and Da and Db of the drain line D. The fail-save valve 119 is associated with a fail-safe actuator 119a for switching the valve position thereof. At normal operational state of the active suspension system, the fail-safe actuator 119a is maintained at inoperative state to place the fail-safe valve at a supply mode position for establishing communication between the portions Sa and Sb for permitting the line pressure to be supplied therethrough. On the other hand, the fail-safe actuator 119a is responsive to fault indicative signal generated in the active suspension control system to become active state for switching the valve position to a fail-safe mode position. At this position, the portion Sa of the supply line S is directly connected to the portion Da of the drain line D with disconnecting the portion Sa from the portion Sb. At this fail-safe mode position, supply of the line pressure for the pressure control valve is blocked and is directly drained through the drain line D and the operational one-way check valve 300. Variety of constructions, circuit layout operation of the fail-safe valve has been illustrated in the co-pending U.S. patent application Ser. No. 303,338, filed on Jan. 26, 1989, which has been assigned to the common assignee to the present invention. The disclosure of the above-identified U.S. Patent Application is herein incorporated by reference for the sake of disclosure.

An oil cooler 104 which is associated with an electric fan 105, is disposed in the drain line D for cooling the working fluid returning to the reservoir tank 116a.

A variable orifice assembly 149 is disposed in the control line C for providing controlled magnitude of fluid flow restriction for introducing and draining of fluid pressure into and from the working chamber 26d. In the shown embodiment, the variable orifice assembly 149 is switchable between a first fully open position as illustrated by the path 149a and a second flow restricting position as illustrated by the path 149b. In order to selectively establish the fully open path 149a and the flow restricting path 149b, a movable valve body is provided in the variable orifice assembly 149. The valve body is biased by means of a set spring 149c so that the valve body is normally positioned at a position corresponding to the fully open position of the variable orifice assembly 149 while the line pressure in the supply line S introduced via a by-pass path 149d is higher than a predetermined set pressure. On the other hand, the set spring causes shifting of the valve body to the flow restricting position in response to lowering of the line pressure in the supply line S. As will be appreciated, the set spring 149 is provided a spring force defining the aforementioned predetermined set pressure so that the position of the valve body is varied between the fully open position and flow restricting position when the line pressure varies across the set pressure thereof.

Figure 5:
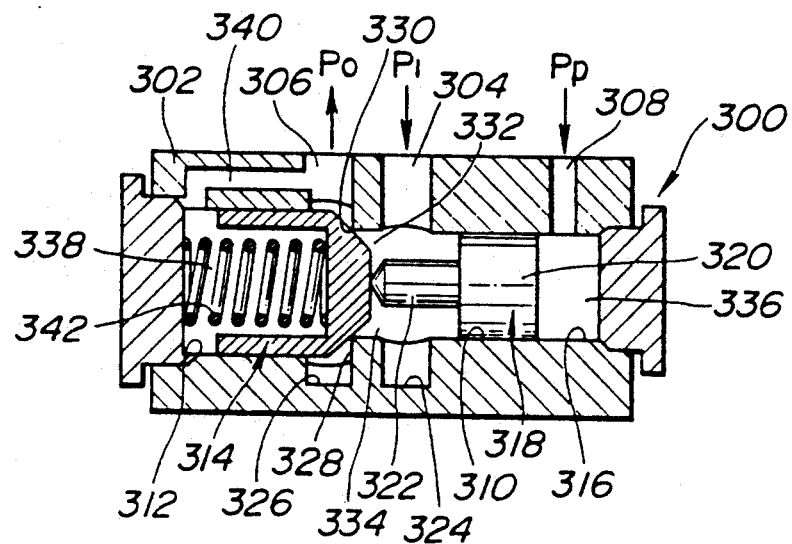
FIG. 5 is a sectional view of an operational one-way check valve employed in the preferred embodiment of the hydraulic circuit of the active suspension system of the invention.

FIG. 5 shows the detailed construction of the preferred embodiment of the operational one-way check valve 300 to be employed in the preferred embodiment of the active suspension system according to the present invention. As shown in FIG. 5, the operational one-way check valve 300 comprises a valve housing 302 formed with an inlet port 304, an outlet port 306 and a pilot port 308. The valve housing 302 defines a valve bore 310. The valve bore 310 comprises a larger diameter section 312, in which a poppet valve 314 is thrustingly disposed, and a smaller diameter section 316, in which a valve spool 318 is disposed. The pilot port 308 is communicated with the supply line 35 at the section Da disposed between the one-way check valve 204 and the pressure control valve unit 28FL 28FR, 28RL and 28RR, via the pilot line 300a. The pilot port 308 is, on the other hand, communicated with the smaller diameter section 316 to supply the line pressure of the supply line S at the orientation downstream of the one-way check valve 204 as the pilot pressure Pp. On the other hand, the inlet port 304 is communicated with the drain port 54r of the pressure control valve unit 28 via a section Da of the drain line D. The inlet port 304 communicates with the smaller diameter section 316 via an annular groove 324 formed on the inner periphery of the valve housing 302. The outlet port 306 is communicated with the fluid reservoir 103 via a section Db of the drain line D and, in turn, communicated with the larger diameter section 312 via an annular groove 326 formed on the inner periphery of the valve housing 302. As seen from FIG. 5, the annular grooves 324 and 326 are oriented in side-by-side relationship with leaving a radially and inwardly projecting land 328. The land 328 has a shoulder 330.

The valve spool 318 and the poppet valve 314 are cooperated with each other to define therebetween a control chamber 334 which communicates with the inlet port 304 and the outlet port 306. On the other hand, the valve spool 318 also defines a pilot chamber 336 at a side remote from the control chamber 334. The poppet valve 314 defines a pressure setting chamber 338 at a side remote from the control chamber 334. The pressure setting chamber 338 is communicated with the outlet port 306 via a path 340. A set spring 342 is disposed within the pressure setting chamber 338 for normally exerting a spring force to the poppet valve 314. In the preferred embodiment, the set spring 342 is provided a set force which corresponds the neutral pressure $P_N$ of the pressure control valve unit 28.

The valve spool 318 has a valve body 320 and a valve stem 322 projecting from the valve body toward the poppet valve 314. The tip end of the valve stem 322 contacts with the mating surface of the poppet valve 314. The poppet valve 314 has an annular shoulder 332 mating with the shoulder of the land 330.

With the construction set forth above, the operational one-way check valve 300 operates as both of the pressure relief valve for relieving the excessive pressure in the drain line and one-way check valve. The relief pressure of the poppet valve 314 can be illustrated by the following balancing equation:

$$F_0 = P_{p0} \times A$$

where
$F_0$ is the set pressure of the set spring 342;
A is an effective area of the spool; and
$P_{p0}$ is a relief pressure.
Here, assuming that the pressure Pi at the inlet port 304 is greater than or equal to the pilot pressure Pp at the pilot chamber 336, the valve spool 318 is shifted away from the poppet valve 314 so that the pilot pressure Pp in the pilot chamber 336 is not active on the valve position of the poppet valve. In such case, the poppet valve 314 operates purely as the pressure relief valve for relieving excessive pressure. At this time, the force balance as illustrated by:

$$Pi \times A = P_{p0} \times A$$

can be established. Therefore, as long as the fluid pressure at the inlet port 304 is higher than the relief pressure $P_{p0}$, the shoulder 332 of the poppet valve 314 is held away from the shoulder 330 of the land 328 so as to permit fluid flow through the outlet port 306 and the section Da of the drain line D to the fluid reservoir 103. On the other hand, when the pressure at the inlet port 304 is lower than or equal to the relief pressure $P_{p0}$, then, the spring force of the set spring 342 overcomes the fluid pressure to establish contact between the mating shoulders 332 and 330 to block fluid communication between the control chamber 334 and the outlet port 306.

On the other hand, when the pressure Pi at the inlet port 304 is lower than the pilot pressure $P_p$ in the pilot chamber 336, the valve spool 318 is shifted toward the poppet valve 314 to contact with the latter at the tip end of the valve stem 334. At this time, the force to depress the valve stem 334 onto the poppet valve 314 can be illustrated by $(P_p - P_i) \times A$. At this time, the pressure Pi introduced into the control chamber 334 via the inlet port 304 is canceled as an internal pressure. Therefore, the pressure balance at the poppet valve 314 can be illustrated by:

$$F_0 + kx = P_p \times A$$

where
k is a spring coefficient of the set spring 342; and
x is a stroke of the poppet valve 314.

From the balancing equations give hereabove, the operational check valve 300 becomes open when the pilot pressure $P_p$ is higher than the relief pressure $P_{p0}$ and is held at shut-off position while the pilot pressure is held lower than the relief pressure.

In the hydraulic circuit set forth above, the fluid in pump 101 is driven by the engine to discharge pressurized working fluid while the engine is running. The pressurized fluid discharged from the outlet of the fluid pump 101 is fed to the pressure control valve 28 via the supply line S including the one-way check valve 101b. When the pressure control valve 28 is shifted to establish fluid communication between the supply port 54s and the pressure control port 54c from the valve position shown in FIG. 2, the pressurized working fluid passes the pressure control valve 28 and is introduced into the working chamber 26d of the hydraulic cylinder 26. On the other hand, when the pressure control valve 28 is shifted to block fluid communication between the supply port 54s and the pressure control chamber PC, the fluid pressure in the supply line S increases. When the line pressure in the supply line S becomes higher than or equal to the set pressure of the pressure relief valve 116 in the pressure relief line 116a, the excessive pressure is fed to the drain line D via the pressure relief valve 116 and thus returned to the reservoir tank 103.

The fluid pressure in the supply line S is also fed to the operational one-way check valve 300 via the pilot line 300a. As set forth, the operational one-way check valve 300 is placed at open position as long as the pilot pressure introduced through the pilot line 300a is held higher than or equal to the set pressure thereof. Therefore, fluid communication between the pressure control valve 28 and the reservoir tank 103 is maintained. At this position, the working fluid is thus returned to the reservoir tank 103 via the drain line D via the operational one-way check valve 300 and the oil cooler 104.

The operational one-way check valve 300, even at the open position, serves as a resistance to the fluid flow. Therefore, the fluid pressure in the drain line D upstream of the operational one-way check valve 300 becomes higher, i.e. higher than the offset pressure $P_0$. Then, the pressure relief valve 116 becomes active to open for allowing the excessive pressure of the working fluid to flow through the pressure relief line 116a.

When the engine stops, the pressure unit ceases operation. By stopping the pressure unit, the working fluid pressure in the supply line S drops. According to drop of the pressure in the supply line S, the pilot pressure to be exerted to the operational one-way check valve 300 via the pilot line 300a drops. When the pressure in the pilot line 300a drops below or equal to the set pressure, the operational one-way check valve 300 is switched into operational one-way check position to block fluid communication therethrough. As a results, the fluid pressure in the drain line D upstream of the operational one-way check valve 300 becomes equal to the pressure in the working chamber 26d. Therefore, even when the working fluid leaks through a gap between the spool valve 52 and the inner periphery of the valve bore, it does not affect the fluid pressure in the working chamber.

Figure 4:
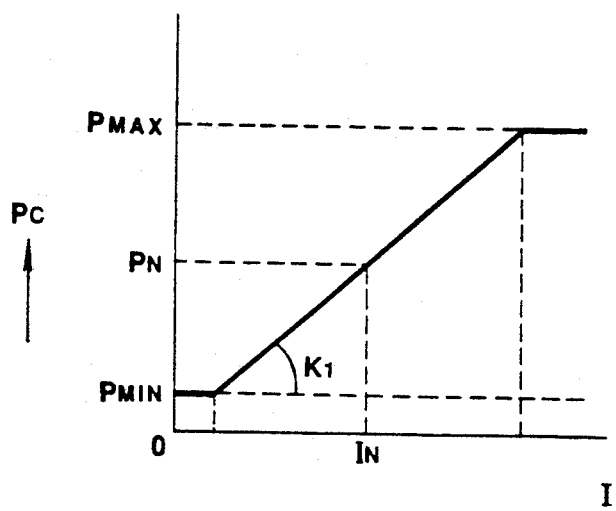
FIG. 4 is a chart showing relationship between an electric current value of a control signal to be supplied for an actuator of the pressure control valve and a working fluid pressure supplied to a working chamber of a hydraulic cylinder.

FIG. 4 shows variation of the working fluid pressure in the working chamber 26d of the hydraulic cylinder 26 according to variation of the current value of the control signal applied to the actuator 29 of the pressure control valve 28. As seen from FIG. 4, the hydraulic pressure in the working chamber 26d varies between a maximum pressure $P_{max}$ which is saturation pressure of the pressure source unit and a minimum pressure $P_{min}$ which is set at a magnitude in view of a noise component to be contained in the control signal. As seen from FIG. 4, the maximum pressure $P_{max}$ corresponds to the maximum current value $I_{max}$ of the control signal and the minimum pressure $P_{min}$ corresponds to the minimum current value $I_{min}$ of the control signal. Furthermore, the hydraulic pressure level as labeled $P_N$ represents neutral pressure at the neutral current $I_N$. As seen, the neutral current $I_N$ is set at an intermediate value between the maximum and minimum values $I_{max}$ and $I_{min}$.

Operation of the aforementioned pressure control valve 28 in terms of control of suspension characteristics and absorption of road shock will be discussed herebelow.

In general, the pressurized working fluid source unit 16 supplies the predetermined line pressure. For example, the line pressure in the supply line S may be set at a pressure of 80 kgf/cm$^2$.

When the vehicle steadily travels on a smooth straight road, the current value of the control signal to be applied to the actuator 29 of the pressure control valve 28 is maintained at the neutral value $I_N$. As long as the neutral value $I_N$ of the control signal is applied to the actuator 29, the proportioning solenoid coil 68 is energized at a magnitude corresponding the neutral value $I_N$ of the control signal to place the poppet valve 48 at the corresponding position. At this position, the flow resistance at the communication path opening 46A, path area of which is restricted by the valve head 48a of the poppet valve 48 becomes the neutral value. At this position of the poppet valve 48, the pilot pressure $P_p$ within the pilot chamber PR is maintained at the neutral pressure $P_N$. At this condition, if the fluid pressures is the control pressure Pc in the pressure control port 54c is held equal to the fluid pressure in the working chamber 26d of the hydraulic cylinder 26, the fluid pressure in the upper and lower feedback chambers FU and FL are held in balance to each other. The valve spool 52 is maintained at the neutral position to shut fluid communication between the supply port 54s, the drain port 54r and the pressure control port 54c. Therefore, the control pressure Pc is maintained at the neutral pressure $P_N$.

At this condition, when relatively high frequency and small magnitude road shock input through the vehicular wheel, is absorbed by fluid communication between the working chamber 26d and the pressure accumulator 34 via the orifice 32. The flow restriction in the orifice 32 serves to absorb the bounding and rebounding energy. Therefore, high frequency and small magnitude road shock can be effectively absorbed so as not to be transmitted to the vehicle body.

When the piston 26c strokes in rebounding direction compressing the working chamber 26d, the fluid pressure in the working chamber increases to increase the control pressure Pc in the pressure control port 54c. Therefore, the control pressure Pc becomes higher than the pilot pressure Pp in the pilot chamber PR. This results in increasing of the fluid pressure in the lower feedback chamber FL at a magnitude higher than that in the upper feedback chamber FU. This causes upward movement of the valve spool 52 to establish fluid communication between the drain port 54r and the pressure control port 54c. Therefore, the pressure in the pressure control port 54c is drained through the drain line D. This causes pressure drop at the pressure control port 54c so that the control pressure Pc becomes lower than the pilot pressure Pp in the pilot chamber PR. Then, the fluid pressure in the upper feedback chamber FU becomes higher than that in the lower feedback chamber FL. Therefore, the valve spool 52 is shifted downwardly to establish fluid communication between the supply port 54s and the pressure control port 54c. The pressurized working fluid in the supply line S is thus supplied to the working chamber 26d via the pressure control port 54c to increase the fluid pressure. By repeating the foregoing cycles, pressure balance is established between the pressure control port 54c and the pilot chamber PR. Therefore, the control pressure Pc as well as the fluid pressure in the working chamber 26d are adjusted to the pilot pressure.

During the pressure adjusting operation set forth above, the fixed throttling orifice Pro serves for restricting fluid flow from the pressure control port 54c to the drain line D. This flow restriction at the orifice Pro serves as resistance against the rebounding stroke of the piston 26c to damp or absorb energy causing rebounding motion of the vehicle body. Furthermore, as set out, working fluid in the pilot chamber PR is generally introduced through the pilot path PP via the multi-stage orifice Qp and return through the pilot return path PT via the lower section 42Ul of the control chamber 42U and via the multi-stage orifice Pr. As long as the fluid flow in the pilot return path PT is not disturbed and thus steady. The most upstream side orifice Pr' is mainly effective for restricting the fluid flow. Therefore, magnitude of flow restriction is relatively small so as to provide sufficient response characteristics in reduction of the pilot pressure. On the other hand, when the working fluid flowing from the control chamber 42U confluence with the working fluid from the pilot chamber PR, back pressure is produced in the drain port 54r, the fluid flowing through the pilot return path PT is disturbed and thus becomes unstable. This tends to cause serving of the pressurized fluid from the drain port 54r to the pilot chamber PR. In such case, all of the orifices in the multi-stage orifice Pr is effective to create greater flow restriction that than for the steady flow. This avoid influence of the back pressure created in the drain port 54r.

Similarly, in response to the bounding stroke of the piston 26c, the valve spool 52 is shifted up and down to absorb bounding energy and maintains the fluid pressure in the working chamber 26d of the hydraulic cylinder 26 at the neutral pressure.

On the other hand, when the anti-rolling suspension control is taken place in response to the lateral acceleration exerted on the vehicle body, the control signal current value is derived on the basis of the magnitude of the lateral acceleration monitored by the lateral acceleration sensor 23. Generally, in order to suppress rolling motion of the vehicular body, the fluid pressure in the working chamber 26d of the hydraulic cylinder 26 which is provided for the suspension mechanism at the side where the vehicular height is lowered across the neutral position, is increased to suppress lowering motion of the vehicle body. On the other hand, the fluid pressure in the working chamber 26d of the hydraulic cylinder 26 which is provided for the suspension mechanism at the side where the vehicular height is risen across the neutral position, is decreased to suppress rising motion of the vehicle body. Therefore, in order to control the pressures in the working chambers 26d of the both side hydraulic cylinders 26, control signal current values are increased and decreased across the neutral value $I_N$.

For example, when rolling motion is caused by left turn of the vehicle, control current for the actuators 29 of the pressure control valves 28 controlling the fluid pressures in the front-right and rear-right hydraulic cylinders 26FR and 26RR are to be increased to be greater than the neutral current $I_N$, and the control current for the actuator of the pressure control valves 28 controlling the fluid pressures in the front-left and rear-left hydraulic cylinders 26FL and 26RL are to be decreased to be smaller than the neutral current $I_N$. By the control current supplied to respective actuators 29, the proportioning solenoid coils 68 are energized at the magnitudes corresponding to the control signal currents to place the poppet valves 48 at respective corresponding positions. By variation of the positions of the poppet valves 48, flow restriction magnitude at respective communication path openings 46A is varied to vary the pilot pressures Pp in the pilot chamber PR. As set forth, since the fluid pressures in the working chambers 26d become equal to the pilot pressures Pp, the suspension characteristics at respective hydraulic cylinders 26 can be adjusted.

Anti-pitching, bouncing suppressive suspension control can be performed substantially in the same manner to that discussed with respect to the anti-rolling control. Furthermore, for the preferred embodiment of the active suspension system as set forth above, various logic of vehicular body attitude change suppressive control, pressure control valve constructions, the operational one-way check valve constructions and so forth are applicable.

The particular feature of the shown embodiment of FIGS. 1 through 5, resides in the presence of the variable orifice assembly 149. As set forth, the variable orifice assembly 149 normally provides full path area as long as the line pressure in the supply line S is maintained higher than the predetermined set pressure and switches into the flow restricting position in response to drop of the line pressure across the predetermined set pressure for reducing the fluid flow path area. Drop of line pressure below the predetermined set pressure can be caused by relatively large magnitude of vibration, such as bouncing motion. The shown embodiment of the active suspension system can provide satisfactory large damping coefficient even when the line pressure is lower than the set pressure by the effect of the orifice. Providing assurance of generation of satisfactorily large damping coefficient in response to substantial magnitude of vibration, the path area of the control line can be maintained fully open while the line pressure is higher than or equal to the set pressure so that satisfactorily high shock absorbing performance can be achieved.

Figure 6:
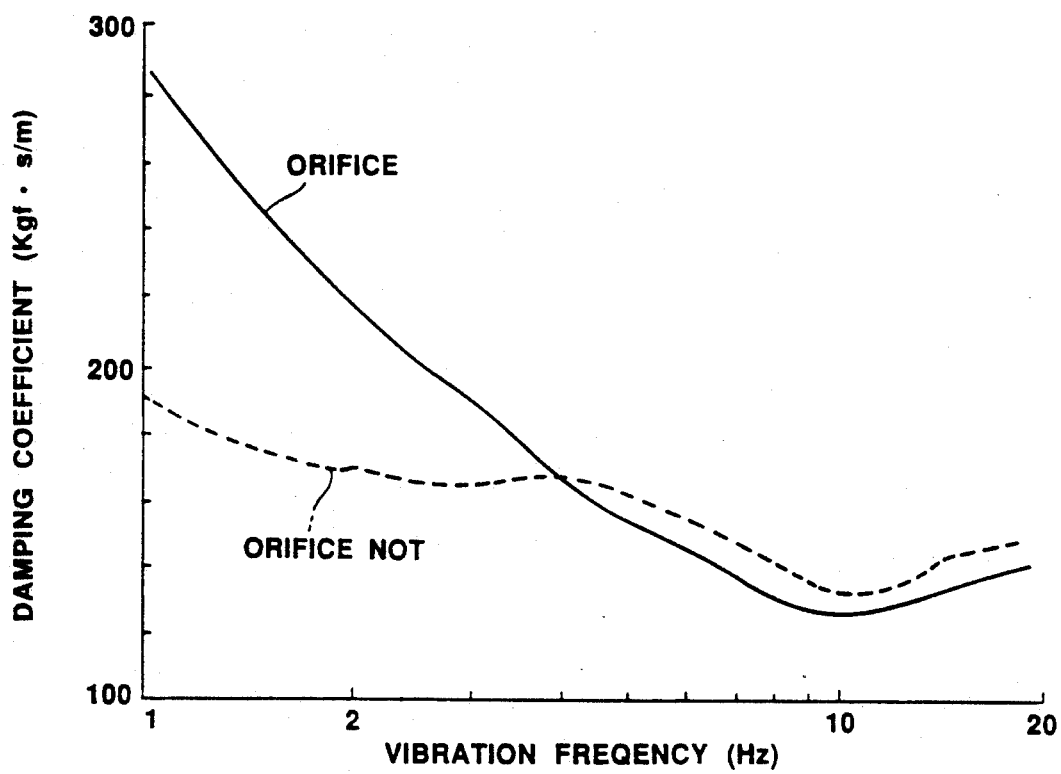
FIG. 6 is a chart showing variation of damping coefficient in relation to a vibration frequency.
Figure 7:
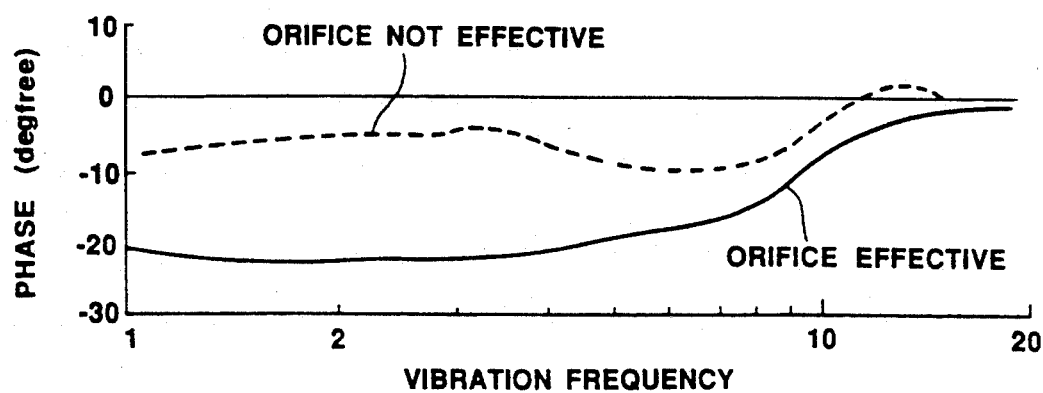
FIG. 7 is a chart showing variation of phase in relation of a vibration frequency.
Figure 8A:
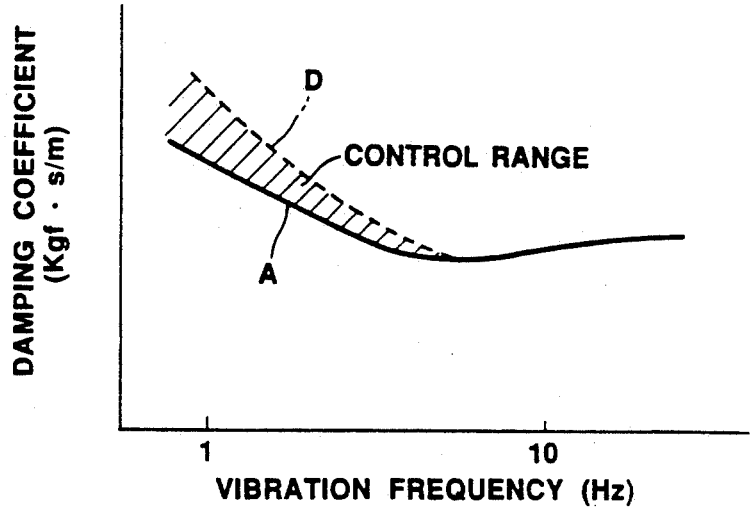
FIGS. 8(A), 8(B) and 8(C) are charts showing damping coefficient in relation to vibration frequency.
Figure 8B:
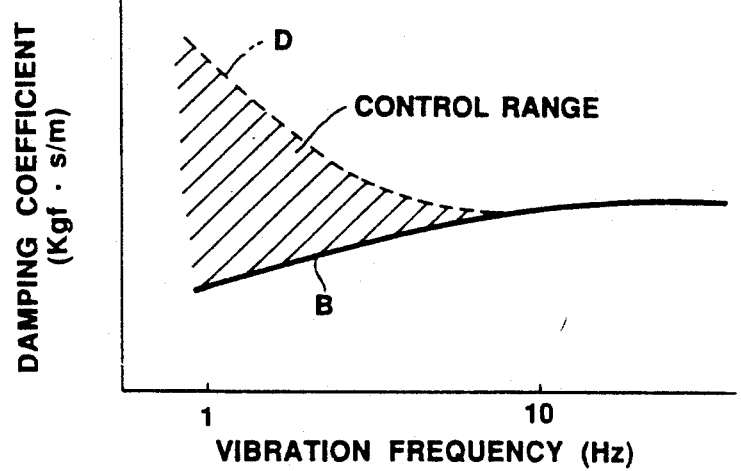
Figure 8C:
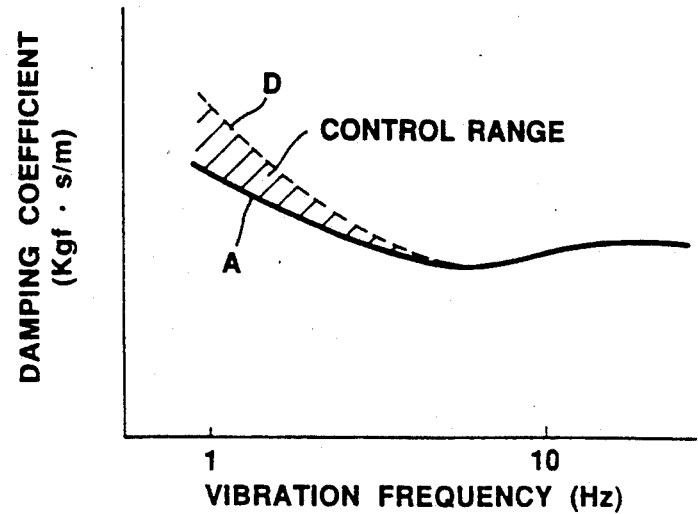

The effect of the variable orifice can be seen from FIGS. 6 and 7. In FIG. 6, the damping coefficient (kg.fs/m) versus vibration frequency (Hz) varies as shown by broken line when the orifice is fully open and varies as shown by solid line when the orifice provides flow restriction. On the other hand, in FIG. 7, the phase delay (degree) versus vibration frequency (Hz) varies as shown by broken line when the orifice is fully open and thus not active, and varies as shown by solid line when the orifice is active. As can be appreciated herefrom, presence of orifice may provide greater damping coefficient at relatively low frequency range. This effect of orifice is generally useful. However, in case of the active suspension system, the damping coefficient is determined not only by the orifice effect but, more importantly by the adjustment of the fluid pressure in the working chamber. When the orifice is active at relatively low frequency range as illustrated in FIG. 8(A), damping coefficient of the orifice is as illustrated by the solid line A. As can be seen, the line A extends at close orientation of the damping coefficient generated by the pressure control valve 26 as illustrated by the broken line D. Therefore, the range for adjustment of the damping characteristics is restricted within the range represented by the hatched area, as can be seen from FIG. 8(A). This clearly prevents the active suspension system to permit wider range of adjustment of the damping characteristics. In contrast to this, in the shown embodiment, the variable orifice is maintained at the fully open when the line pressure is maintained higher than the set pressure. Since the line pressure tends to drop below the set pressure in response to relatively high frequency and relatively large magnitude of vibration, the variable orifice is held open at relatively low frequency range to maintained the characteristics as illustrated by broken lines in FIGS. 6 and 7. As a result, as can be seen from FIG. 8(B), wider adjustment range (hutched area) can be provided. On the other hand, when the variable orifice is switched into flow restricting position, the orifice effect becomes substantially same as that of the fixed path area orifice, as can be seen from FIG. 8(C).

Wider adjustment range at low frequency range will provide wider range of tuning of the suspension characteristics.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

Figure 9:
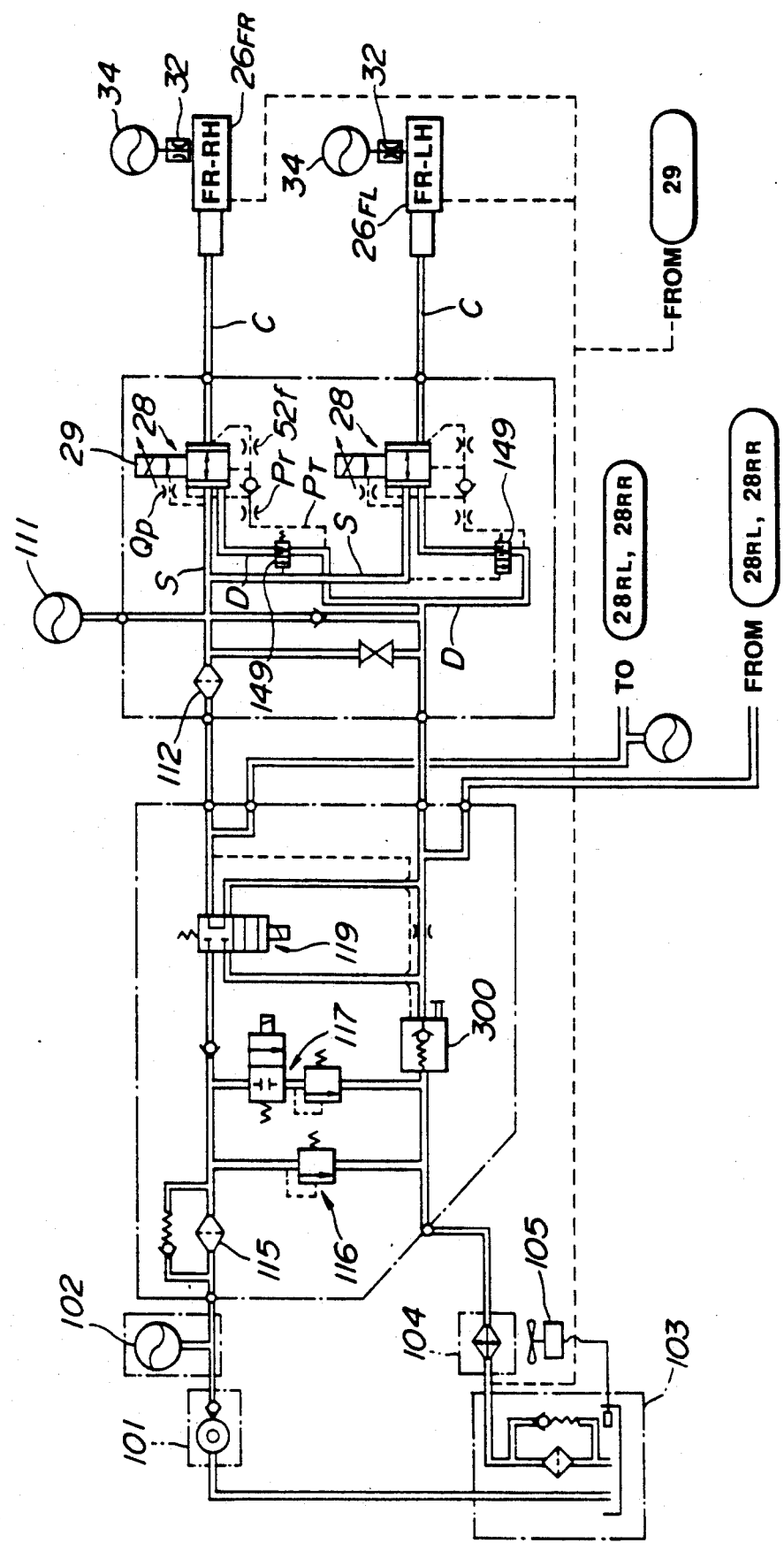
FIGS. 9 to 11 are diagram respectively showing variations of the preferred embodiment of the hydraulic circuits for active suspension system according to the present invention.
Figure 10:
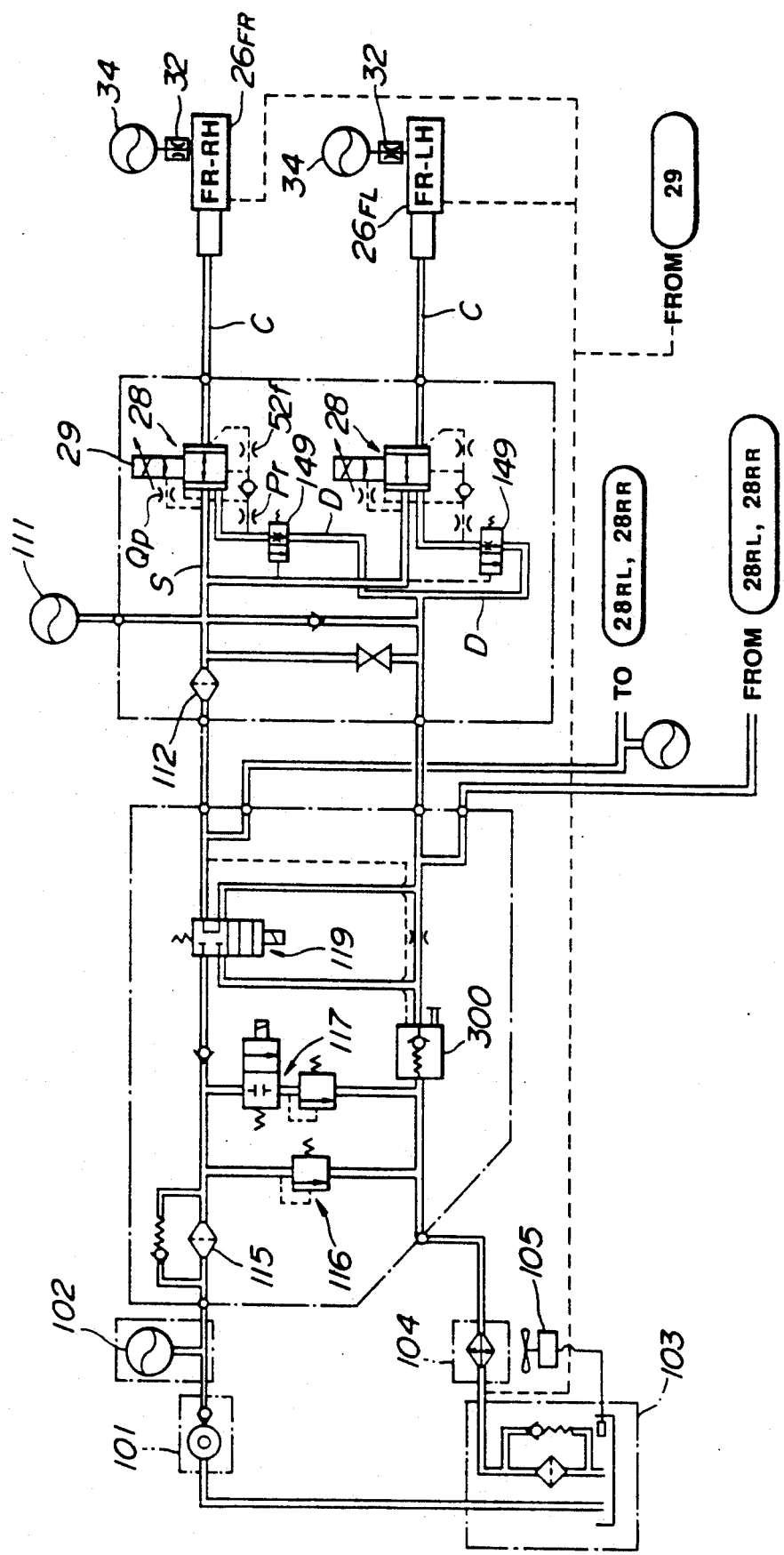
Figure 11:
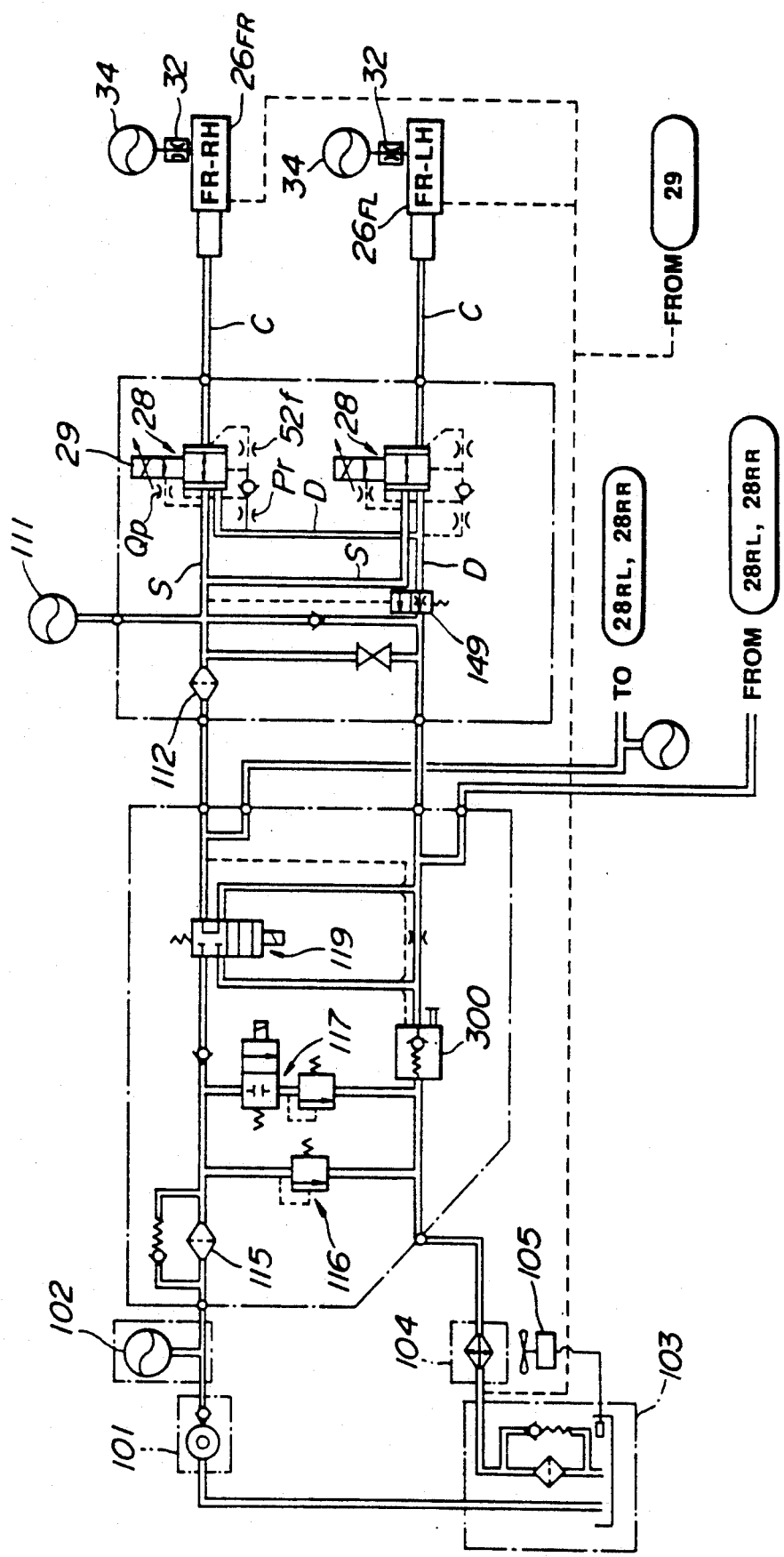

For example, as shown in FIG. 9, the variable orifice assembly 149 can be provided in the drain line D at an orientation immediate downstream of the drain port and upstream of the junction between the pilot return path PT and the drain line D. Also it is possible to provide the variable orifice assembly 149 can be provided in the drain line D at an orientation downstream of the junction between the pilot return path PT and the drain line D, as shown in FIG. 10. In the further alternative, the variable orifice assembly 149 is provided in the drain line D at an orientation downstream of the junction where the branch lines connected to the drain ports of the pressure control valves 26FL and 26FR are adjoined.

These modification of the hydraulic circuit layout may provide substantially the same or similar effect to that discussed above.

Therefore, the present invention fulfills all of the objects and advantages sought therefor.

What is claimed is:

1. An active suspension system comprising:
a hydraulic cylinder disposed between a vehicle body and a suspension member rotatably supporting a road wheel, said hydraulic cylinder defining a variable pressure working chamber;
a pressure source for supplying a pressurized fluid;
a pressure control valve assembly disposed between said pressure source and said working chamber for introducing and draining the fluid pressure into and from said working chamber, said pressure control valve assembly defining a first chamber connected to said working chamber for fluid communication therebetween via a first line, a second chamber connected to a fluid pressure source via a second line for introducing line pressure from said fluid pressure source into said working chamber, and a third chamber connected to said fluid pressure source via a third line for draining pressurized fluid to said fluid pressure source from said working chamber, said pressure control valve assembly including a valve member for selectively establishing and blocking fluid communication between said first and second chambers and said first and third chambers; and
a flow restriction means for restricting fluid flow from said working chamber, said flow restriction means being responsive to the line pressure in said second line higher than or equal to a predetermined pressure level for providing a first and smaller flow restriction magnitude and responsive to the line pressure in said second line lower than said predetermined pressure level for providing a second and greater flow restriction magnitude.

2. An active suspension system as set forth in claim 1, wherein said responsive flow restriction means comprises a variable orifice assembly disposed in said first line.

3. An active suspension system as set forth in claim 1, wherein said responsive flow restriction means comprises a variable orifice assembly disposed in said third line.

4. An active suspension system as set forth in claim 2, wherein said variable orifice assembly is switchable between a first position, at which the fluid path is fully open to provide said first flow restriction magnitude and a second position, at which the fluid path area is limited to provide second flow restriction magnitude.

5. An active suspension system as set forth in claim 3, wherein said variable orifice assembly is switchable between a first position, at which the fluid path is fully open to provide said first flow restriction magnitude and a second position, at which the fluid path area is limited to provide second flow restriction magnitude.

6. An active suspension system as set forth in claim 1, wherein said pressure control valve further defines a pilot chamber to which a pilot pressure derived from said line pressure is introduced from said second line and drained to said third line, said pilot chamber being oriented in opposition to one end of said valve member, and a feedback chamber opposing to said valve member, to which a feedback pressure in said first line is introduced so that the valve member is placed at a position where a balance between said pilot pressure and said feedback pressure is established.

7. An active suspension system as set forth in claim 3, wherein said pressure control valve further defines a pilot chamber to which a pilot pressure derived from said line pressure is introduced from said second line and drained to said third line, said pilot chamber being oriented in opposition to one end of said valve member, and a feedback chamber opposing to said valve member, to which a feedback pressure in said first line is introduced so that the valve member is placed at a position where a balance between said pilot pressure and said feedback pressure is established.

8. An active suspension system as set forth in claim 1, wherein said responsive flow restriction means is provided at an orientation upstream of a junction where a pilot pressure return line for connecting said pilot chamber to said third line is connected to said third line.

9. An active suspension system as set forth in claim 6, wherein said responsive flow restriction means is provided at an orientation downstream of a junction where a pilot pressure return line for connecting said pilot chamber to said third line is connected to said third line.

10. An active suspension system as set forth in claim 1, wherein said pressure control valve is provided for each of a plurality of suspension systems for each road wheel for independent adjustment to the other, said third line includes a plurality of branched lines respectively connected to said third chamber of each of said pressure control valves and adjoined to each other at a confluence point, and said flow restriction means is provided at an orientation downstream of said confluence point.

* * * * *

UNITED STATES PATENT AND TRADEMARK OFFICE
CERTIFICATE OF CORRECTION

PATENT NO. : 5,076,606
DATED : December 31, 1991
INVENTOR(S) : Kenro TAKAHASHI

It is certified that error appears in the above-identified patent and that said Letters Patent is hereby corrected as shown below:

On title page, item [30], Foreign Application Priority Data:

"March 28, 1989" should read --March 27, 1989--.

Signed and Sealed this

Thirtieth Day of March, 1993

*Attest:*

STEPHEN G. KUNIN

*Attesting Officer*     *Acting Commissioner of Patents and Trademarks*